United States Patent [19]
Oberthur

[11] 3,744,507
[45] July 10, 1973

[54] SWITCHOVER VALVE FOR PNEUMATIC INSTALLATIONS

[75] Inventor: Heinrich Oberthur, Offenbach-Rumpenheim, Germany

[73] Assignee: Alfred Teves GmbH, Frankfurt Main, Germany

[22] Filed: July 21, 1971

[21] Appl. No.: 164,581

Related U.S. Application Data

[60] Division of Ser. No. 873,746, Nov. 26, 1969, Pat. No. 3,613,710, and a continuation of Ser. No. 668,462, Sept. 18, 1967, abandoned.

[30] Foreign Application Priority Data

Sept. 22, 1966 Germany............................ T 32107

[52] U.S. Cl. .............................................. 137/107
[51] Int. Cl. ............................................... G05d 7/00
[58] Field of Search.................... 137/102, 103, 107; 303/40, 60

[56] References Cited
UNITED STATES PATENTS

| | | | |
|---|---|---|---|
| 2,735,441 | 2/1956 | Regna.................................. | 137/102 |
| 3,002,520 | 10/1961 | Morse.................................. | 137/102 |
| 3,074,382 | 1/1963 | Alfieri............................. | 137/102 X |
| 3,011,833 | 12/1961 | Stelzer................................. | 303/60 |

Primary Examiner—Martin P. Schwadron
Assistant Examiner—David J. Zobkiw
Attorney—Karl F. Ross

[57] ABSTRACT

A fluid-operated switchover valve having an outlet communicating with a gas chamber (e.g. of a charging cylinder for a hydrodynamic brake system), a first inlet communicating with a source of gas (e.g. an air-pressure tank or the atmosphere) and another control inlet subjected to reduced pressure (e.g. from a suction reservoir), the valve having a housing forming an elongated bore for a valve piston bearing against a spring with the pressure of the first inlet and a valve member slidable in the piston and co-operating therewith to form a valve which alternatively connects the suction inlet and the air inlet with the chamber.

7 Claims, 3 Drawing Figures

Heinrich Oberthür
INVENTOR.

BY Karl G. Ross

Attorney

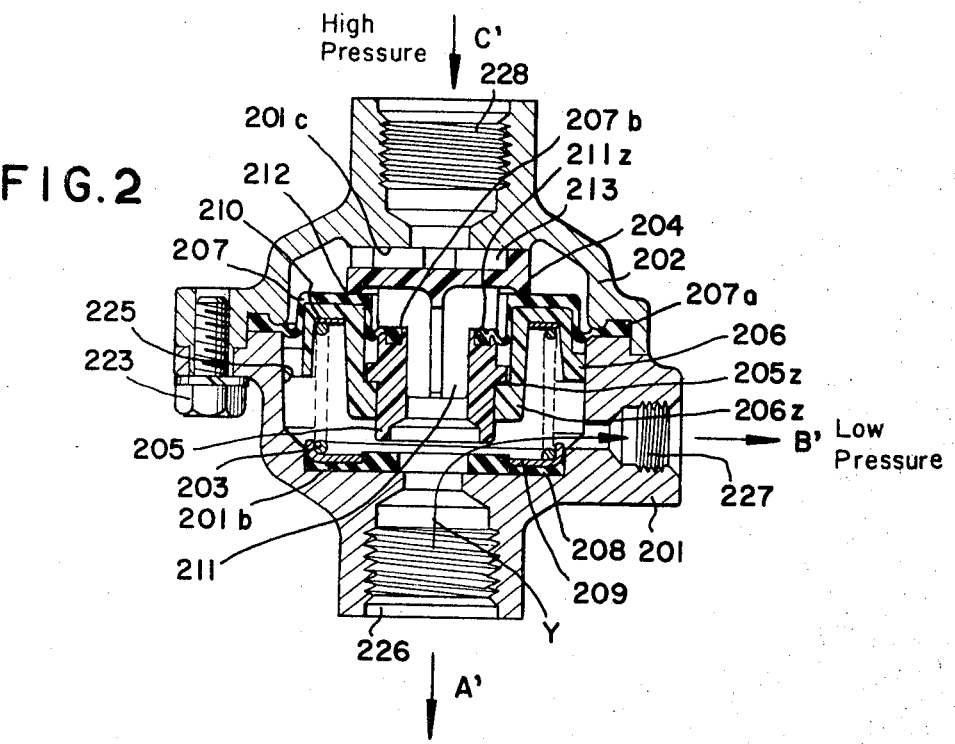
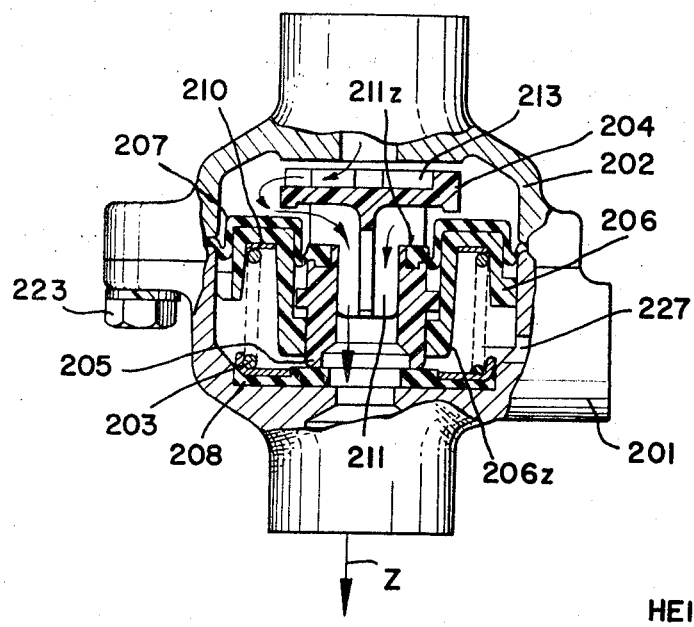

SWITCHOVER VALVE FOR PNEUMATIC INSTALLATIONS

CROSS REFERENCE TO RELATED APPLICATIONS

This is a division of copending application Ser. No. 873,746 filed on Nov. 26, 1969, now U.S. Pat. No. 3,613,710 as a continuation of the now abandoned application Ser. No. 668,462 filed on Sept. 18, 1967.

FIELD OF THE INVENTION

My present invention relates to a switchover valve for pneumatic and other gas control systems and, more particularly, to a control valve operated by fluid pressure and adapted to alternatively connect a suction source and a pressure source with a gas chamber to be subjected to the influences of these sources.

BACKGROUND OF THE INVENTION

It has already been proposed to provide fluid-pressure-responsive valves having pistons displaceable under a fluid-pressure differential between alternate positions in which one or another port of the valve communicates with a common port connected with a working member of a pneumatic or hydropneumatic installation.

In the commonly assigned U.S. Pat. No. 3,449,017 issued on June 1, 1969 on application Ser. No. 668,462, copending with the patent application and entitled BRAKE SYSTEM, I, together with J.R. Botterill and Hans-Christof Klein, describe and claim a vehicle-brake installation having a hydrodynamic brake of the type generally set forth in commonly assigned U.S. Pat. Nos. 3,265,162 of Aug. 9, 1966 and 3,302,755 of Feb. 7, 1967 or of the prior systems of U.S. Pat. Nos. 1,297,225 and 2,241,189. As pointed out in application Ser. No. 668,462, a hydrodynamic brake generally consists of a toroidal or cylindrical shell half connected with the rotating shaft to be braked (e.g. an axle shaft of the automotive vehicle) while a confronting, generally similar shell half is mounted upon a relatively stationary support, e.g., the vehicle chassis. The mutually concave shell halves define an annular chamber whose vanes subdivide it into a plurality of generally segmental compartments receiving a hydraulic fluid. The hydraulic fluid is pumped around the vanes by the rotor and stator shell members and establishes a pressure differential thereacross, while a transmission line completes, with the hydrodynamic brake and a heat exchanger, the braking assembly.

The pressurization of the liquid within the hydrodynamic brake determines the brake efficiency and, even at low speeds, in which no pressurization is desired, considerable pumping of the hydraulic fluid continues to the detriment of the fluid and the apparatus itself. Furthermore, the efficiency of hydrodynamic brakes of this character decreases sharply with rotary speed and at relatively low speeds. The hydrodynamic brake is ineffective as a practical matter so that auxiliary friction brakes must be provided. To eliminate the disadvantages of hydraulic pumping when brake operation is not required, the aforementioned U.S. Pat. No. 3,449,017 provides a novel system for operating the hydrodynamic brake. In that system, the hydrodynamic brake is provided with a fluid-pressure-responsive accumulator whose fluid compartment (which may be directly exposed to a gas chamber formed thereabove) communicates with the hydrodynamic brake, selectively energizable by an elevated fluid pressure (at least one atmosphere) for normal brake operation but is de-energizable for the "idle" of the hydrodynamic brake by subjecting the charging selector to a negative, i.e., subatmospheric pressure, tending to withdraw fluid from the hydrodynamic brake into the charging cylinder. The switchover is effected by a control valve communicating with the brake master cylinder which also operates the friction brake. In addition to this control valve the system provides a reversing or switchover valve between the control valve and the brake-charging cylinder for selectively connecting the suction source and the pressure source with the air chamber of the latter. The present invention relates primarily to switchover valves which are useful in systems of these types and the following description may refer to such installations from time to time, it being understood that other pneumatic hydropneumatic or hydraulic installations may also utilize the valve which basically is a fluid-responsive valve for alternately connecting a negative-pressure port and a positive-pressure port to a common port to be subjected either to reduced or to elevated pressures.

OBJECT OF THE INVENTION

Since prior-art valves performing a similar function have been unduly complex, difficult to assemble, prone to breakdown and imprecise with respect to the threshold at which switchover occurs, it is the principal object of the present invention to provide an improved valve of the character described obviating the aforementioned disadvantages.

SUMMARY OF THE INVENTION

This object and others which are described in greater detail hereinafter are attainable in accordance with the present invention which provides a switchover valve whose valve body has at least three ports including a first inlet port exposed to a relatively elevated pressure of the atmospheric or superatmospheric level, a second port exposed to a relatively reduced pressure, generally a negative subatmospheric pressure, and a third port communicating with a device to be subjected either to the reduced pressure or to the high pressure of the respective sources communicating with the first and second ports. The valve body contains valve means responsive to a change in the pressure differential across the first and second inlet ports and corresponding at least to a predetermined threshold value for substantially instantaneously switching over the connection between one of the sources and the third port while blocking communication between the latter and the other sources.

The valve body according to this invention is provided with a chamber receiving a piston means interposed between the first and second ports and slidable in response to the differential thereacross against the force of a restoring spring which bears upon this piston means in a direction opposite the differential while a valve seat cooperating with the piston is yieldably retained by the spring in the opposite direction. The spring force is selected to be greater than the normal pressure differential therebetween but less than the threshold value at which the switchover is to be effective.

DESCRIPTION OF THE DRAWING

The above and other objects, features and advantages of the present invention will become more readily apparent from the following description, reference being made to the accompanying drawing in which:

FIG. 2 is a cross-sectional view of a membrane-type valve embodying the invention; and FIG. 3 is a view similar to FIG. 2 showing the parts thereof in another operative position.

SPECIFIC DESCRIPTION

Figure 1:
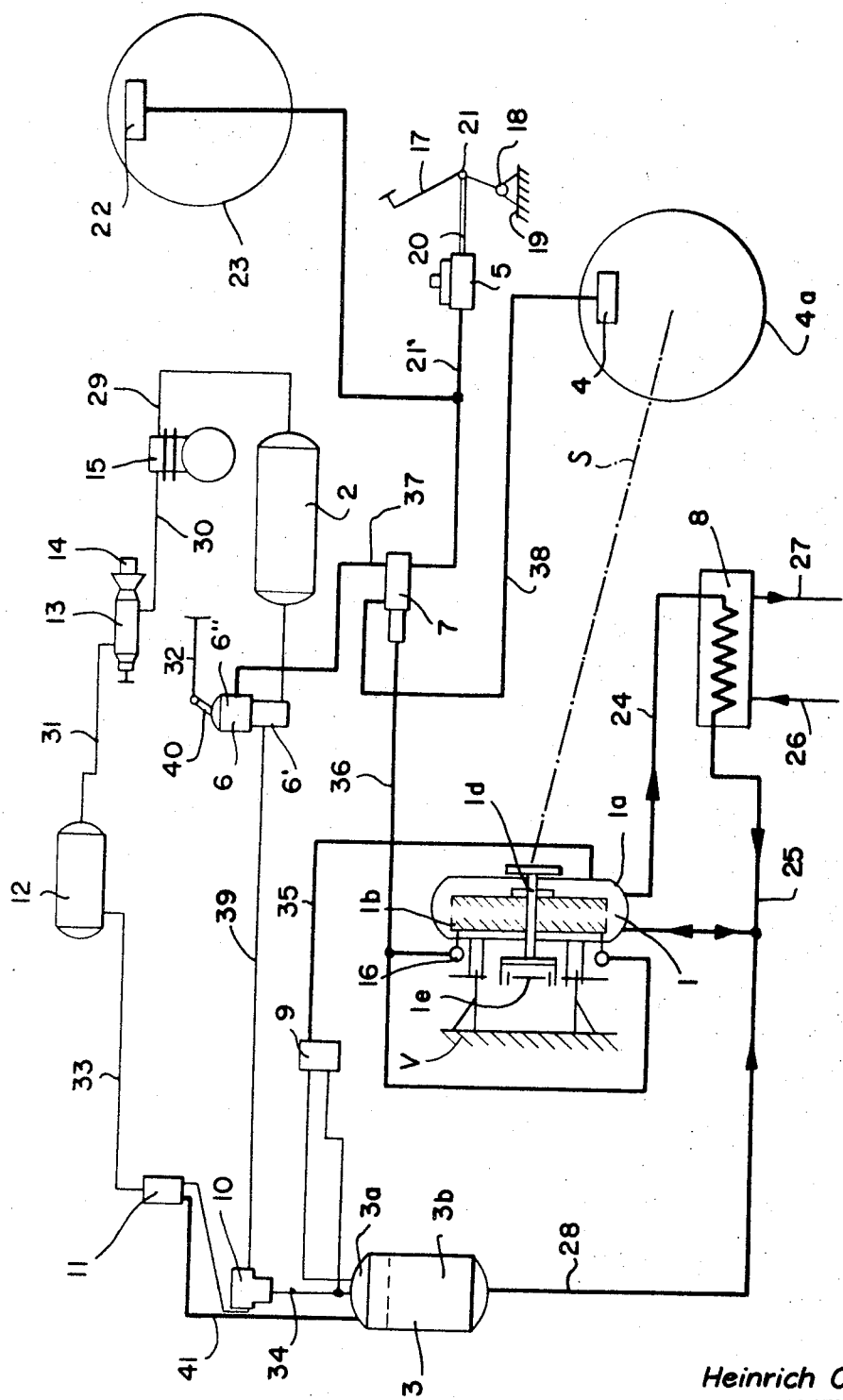
FIG. 1 is a hydraulic circuit diagram of a hydrodynamic-brake system provided with a switchover valve in accordance with the present invention.

In FIG. 1, I show a hydrohynamic-brake system of the type described and claimed in the aforementioned co-pending application and which is an example of a system embodying a switchover valve of the type shown in FIGS. 2 and 3. The brake system of FIG. 1 comprises a hydrodynamic brake 1 whose housing 1a contains a first axially concave generally toroidal vaned member 1b which is affixed to a nonrotatable part of the vehicle V, e.g., its chassis, and confronts an oppositely concave vaned toroidal member 1c coupled with the shaft 1d of the vehicle. This shaft is represented by the dot-dash line S as being diagrammatically coupled with a wheel 4a whose wheel-brake cylinder 4 forms part of a friction brake cooperating with the hydrodynamic brake 1 to bring the vehicle to a standstill. The shaft 1d may be driven by the differential 1e of the power train. During normal brake operation, the brake pedal 17, which is fulcrumed at 18 to the vehicle chassis 19, is depressed to drive the piston rod 20 (articulated at 21 to the brake pedal) to the left and shift the piston within the brake master cylinder 5 to force hydraulic fluid through the conduit 21'. This line also supplies a wheel-brake cylinder 22 whose wheel 23 and axle are not associated with any hydrodynamic brake (e.g. or part of the front-wheel system of the vehicle) so that normal mechanical friction-brake action occurs at this wheel. The rotation of members 1b and 1c of the hydrodynamic brake 1 circulates hydraulic fluid through the lines 24 and 25 of a cooling circuit including the coil of a heat exchanger 8. A cooling fluid is supplied around this coil and removed via lines 26 and 27 in a circulatory path as described in the aforementioned patents. A pressure accumulator, charging cylinder or hydraulic reservoir 3 is shown to have its upper end 3a supplied with air under pressure or exposed to suction via a switchover valve 10 (FIGS. 2 and 3) while its lower end 3b communicates via line 28 with the hydrodynamic brake 1.

A compressor 15 driven by the engine of the vehicle or a separate motor has its discharge or elevated pressure port connected via a line 29 to the pressure source of the charging cylinder 3 which is represented by a compressed-air storage tank 2 connected with compressor 15 at the discharge port 29 of the latter. The suction or intake port of the compressor 15, at which the subatmospheric or reduced pressure is generated, communicates via line 30 with an automatic suction-bypass valve 13 whose intake 14 opens to the atmosphere via an air filter. This valve, conventional in suction systems in which both the pressure and suction sides of the compressor are used, communicates via line 31 with the reduced-pressure source (suction tank 12) of the valve 10. The tank 12 is connected with valve 10 via line 33 and an oil separator 11. The oil separator 11, in which any oil induced to flow upwardly from the charging cylinder 3 toward the suction tank 12 is accumulated and returned thereto via line 41, mechanically traps the oil particles. The gas chamber 3a of charging cylinder 3 communicates also with a pressure-equalizing valve 9 which, in turn, communicates with the hydrodynamic brake 1 via a line 35. As described in U.S. Pat. No. 3,265,162, a feedback arrangement is provided between the hydraulic decelerator or hydrodynamic brake and the control means therefor to ensure that the brake force applied to the shaft S remains constant.

The feedback means may comprise a servofollower represented at 16 and of the type described in the last-mentioned patent. The servofollower communicates via a hydraulic line 36 with the servofollower valve 7 connected between line 21' of the master cylinder 5 and the lines 37 and 38 delivering the brake fluid to the control valve 6 and the wheel-brake cylinder 4, respectively. The control valve 6, whose valve member is received in the valve body 6' and regulates the flow of compressed air from tank 2 through line 39 to the switchover valve 10, has a hydraulically operated cylinder 6" isolated from the pneumatic chamber 6' and provided with a mutually actuatable arm 32 which is able to operate the control valve 6 even when the pedal is not depressed.

When the vehicle is traveling at more or less constant speed with the brake system in a deactuated steady-state condition and no braking is required, the compressor 15 draws air through the valve 13 from the suction tank 12 while forcing air under pressure into the compressed air tank 2. The reduced pressure at the intake side of the compressor 15 is applied through the tank 12 via line 33 and the oil separator 11 to the suction port of the valve 10 (side B' of the valve of FIGS. 2 and 3) and transmitted through this valve and line 34 to the gas chamber 3a overlying the hydraulic fluid level within the charging cylinder 3. Since the charging cylinder 3 is here at subatmospheric or negative pressure, the hydraulic fluid is drawn inwardly from line 28 and hydrodynamic brake 1 which is thereby rendered ineffective and pumps only insignificant quantities of liquid in the idle condition. As soon as the vacuum in tank 12 and the gas space 3a reaches a predetermined absolute value (as established by the bypass valve 13), i.e., when the pressure falls in tank 12 to a predetermined level, valve 13 shifts to block line 31 and communicates between the filtered intake 14 and the suction port of compressor 15, thereby allowing continuous operation of the latter to nevertheless maintain a substantially constant pressure at the tank 12. Air is pumped into the pressure tank 2 during this period and communication between tank 12 and compressor 15 is only restored when the absolute pressure in tank 12 increases to a level sufficient to trip the valve 13, block the intake 14 and reconnect compressor 15 with tank 12.

When the vehicle is engaged in normal road operation and no brake action is required, the pedal 17 is not depressed and no hydraulic fluid is forced from the master cylinder 5 through the line 21' to either of the wheel-brake cylinders 4 and 21 or to the servocontrol valve 7. The negative pressure in chamber 3a of the charging vessel 3 precludes any pumping action of the hydrodynamic brake 1. When the operator presses upon pedal 17 to shift the piston of master cylinder 5 to the left and thereby force hydraulic fluid into the servocontrol valve 7 and the front-wheel brake cylinder 22, initial friction-brake action is commenced. The rear-wheel brake cylinder 4 is actuated via the servovalve 7 simultaneously with the delivery of hydraulic fluid via line 37 to the dual control valve 6 which is thus hydraulically biased to form a path between the air-pressure tank 2 and the reversing valve 10.

As is described in greater detail below with reference to FIGS. 2 – 3, the latter is actuated by the pressure increase in line 39 to form a path between the air-pressure tank 2 and chamber 3a while blocking communication between the vacuum tank 12 and the vessel 3. The gas-pressurized hydraulic fluid is thus forced via line 28 into the hydrodynamic brake 1 and the latter is thereby rendered effective. Hydraulic fluid is now pumped by the relatively rotating members 1b and 1c of the hydrodynamic brake along the circulation path 24, 25 which includes the heat exchanger 8, thereby dissipating the dynamically developed braking heat. The equalizing valve 9 is provided between the outlet side (A' in FIGS. 2 – 3), the charging vessel 3 and the hydrodynamic brake 1 to ensure pressure equality between them. When the hydrodynamic brake is rendered effective (by pressurization of chamber 3a) the stator 1b receives a reaction force which is proportional to the brake force and effectiveness and is transferred to the sensor 16 which itself delivers a control movement to the valve member of servovalve 7 (see U.S. Pat. No. 3,265,162).

Servovalve 7, in turn, varies the hydraulic pressure supplied by line 37 to the control valve 6 and, via line 38, to the wheel-brake cylinder 34 such that the sum of the brake moments of the hydrodynamic brake and the mechanical-friction brake corresponds, regardless of the rate of rotation of the shaft 1d, to a predetermined value associated with the extent of depression of the brake pedal 17 and the corresponding braking effectiveness of a totally mechanical brake system. Thus at a relatively slow speed, i.e., when the hydrodynamic brake effectiveness is minimum, the valve 7 permits the full brake force determined by the setting of master cylinder 5 to be applied to the wheel-brake cylinder 4, thereby bringing the vehicle to a standstill. When the vehicle is operated at elevated speeds at which the hydrodynamic brake is moste effective, a brake-actuating depression of pedal 17 gives rise to an increased pressure in the hydrodynamic brake and practically no pressure in the wheel-brake cylinder 4. Control valve 6 may be mutually actuated at 32 for relatively long periods of downhill travel when only hydrodynamic braking is required.

The central valve illustrated in FIGS. 2 and 3 is usable in the system of FIG. 1 and has a port 226 communicating with the charging vessel 3 as represented by arrows A', a port 227 communicating with the suction source (arrow B') and a pressure port 228 communicating with the compressed-air tank (arrow C'). The valve has a valve body 201 formed with the ports 226 and 227 and defining a cylinder bore 225 with a cover 202 which is clamped thereagainst by bolts 223 to sandwich a membrane 207 between them. In this system, ports 226 and 228 are coaxial while port 227 has an axis at right angles to the common axis of ports 226 and 228.

The port 226 is surrounded by a washer 208 which is held against the end 201b of the bore 225 by a spring 203 and a metallic abutment ring 209. The other side of the helical-coil compression spring bears via another abutment ring 210 against a piston 206 which is slidable in the bore 225. The annular membrane 207 has a bead 207a locked in a complementary recess between the housing parts 201 and 202 while its inner periphery is formed with a rim 207b received in a sleeve 205 axially shiftable with and relative to the piston 206 and composed of an elastomeric material. A ridge 212 of the valve plate 204 bears upon the membrane 207 and retains it against a transverse surface of the piston 206 with the cruciform-section valve stem 211 guiding the sleeve 205. On its upper surface, the valve plate 204 is provided with milled grooves 213 abutting the wall 201c under the force of coil spring 203. In the position illustrated in FIG. 2, i.e. the "low-pressure position", the synthetic-resin valve plate 204 is held against surface 201c while the spring 203 urges the piston 206 upwardly to bring the ridge 212 into sealing engagement with the rubber membrane 207. The sleeve 205 is retained in its uppermost position by an inwardly extending flange 206z which engages the circumferential flange 205z of the sleeve. The upper position of the latter is defined by the stop surface 211z of the shank 211. Thus, communication is established between the port 226 and the suction side of the system (arrow Y) and the charging cylinder 3 is mounted under reduced pressure. The inlet 228 is blocked by the membrane 207. When the pressure increases at port 228, the piston 206 and the membrane 207 are shifted in the direction of washer 208 until the sleeve 205 sealingly engages the latter to block communication between port 226 and port 227. The further movement of piston 206 in this direction brings the shank 211 into engagement with the sleeve 205 to lift the valve plate 204 from the membrane 207 and the piston and permit air to flow as represented by arrow Z through the port 226. When the pressure at port 228 decreases, spring 203 initially closes the pressure side C' and reestablishes communication between ports 226 and 227 when further movement of the piston 206 lifts the sleeve 205 from the washer 208.

I claim:

1. A pressure-responsive switchover valve for the alternate connection of a relatively low-pressure source and a relatively high-pressure source with a device operable thereby, said valve comprising:

a housing provided with a first port connectable with said source of relatively high pressure, a second port connectable with said source of relatively low pressure, a third port, connectable with said device, and a chamber communicating with said ports, said first, said second and said third ports constituting the sole fluid-connection ports of the valve;

piston means including a tubular piston body movably mounted in said chamber between said first and second ports and responsive to a pressure differential thereacross for movement in the direction of said second port by an increase in pressure at said first port beyond a predetermined threshold, said tubular piston body forming a passage between said first and third ports;

spring means in said chamber bearing upon said piston means for resisting displacement thereof in said direction:

valve means including:

a valve member slidably received in said piston body and extending into said body while maintaining said passage, said valve means being operable upon movement thereof in said direction to block communication between said second and third ports and establish communication between said first and third ports, said valve member being movable jointly with said piston body and independently thereof, a head formed on said member and sealingly engaging said piston body around said passage to prevent fluid flow through said piston body in a position thereof in which said spring means retains said piston means against movement, and a slidable sleeve operatively connected to said member and extending transversely to said head and retainable against movement in said direction for lifting said head from said piston body to permit fluid flow around said member through said passage of said piston body upon displacement of said piston body in said direction beyond a predetermined degree; and a valve seat in said housing including a sealing ring in said chamber surrounding said third port and engageable by said sleeve to block fluid flow therethrough, said spring means being seated against said housing around said valve seat and surrounding said sleeve while yieldably urging said piston body against said head, said head being disengaged from said piston body only upon engagement of said sleeve with said valve seat and said sleeve disengaging said valve seat only upon engagement of said head with said piston body to block said passage.

2. A valve as defined in claim 1 wherein said piston body has an annular face remote from said second port and confronting said first port, said member having an annular ridge facing in the direction of said second port and engageable with said face.

3. A valve as defined in claim 2 wherein said face is formed with a layer of an elastomeric sealing material.

4. A valve as defined in claim 3 wherein said layer forms an annular membrane anchored at its outer periphery to said housing and resting against said body.

5. A valve as defined in claim 4 wherein said membrane is in continuous sealing engagement with said sleeve.

6. A valve as defined in claim 1 wherein said spring means is a compression spring bearing at one end against said sealing ring and at the other end against said body.

7. A pressure-responsive switchover valve for the alternate connection of a relatively low-pressure source and a relatively high-pressure source with a device operable thereby, said valve comprising:

a valve body comprising an inlet half and an outlet half and formed with a first port connectable with the high-pressure source, a second port connectable with the low-pressure source, a third port connectable with said device, and a chamber communicating with said ports;

an annular membrane in said chamber having an outer periphery clamped between said halves;

a piston attached to the inner periphery of said membrane and movable in said chamber between said first and second ports and responsive to a pressure differential across said membrane for movement in the direction of said second port by an increase in pressure at said first port beyond a predetermined threshold;

spring means in said chamber bearing on said piston for resisting displacement thereof in said direction; and valve means cooperating with said piston and operable upon movement thereof in said direction to block communication between said second and third ports and establish communication between said first and third ports, said valve means including a valve body slidably received in said piston into and out of a position engaging said membrane and blocking fluid flow through said piston from said first to said third port.

* * * * *